(12) United States Patent
Aizawa et al.

(10) Patent No.: US 9,252,527 B2
(45) Date of Patent: Feb. 2, 2016

(54) MULTIPLE WIRE CONNECTING TERMINAL

(71) Applicants: AUTONETWORKS TECHNOLOGIES, LTD, Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Takeshi Aizawa, Yokkaichi (JP); Satoshi Morikawa, Yokkaichi (JP); Yoshihiro Uchiyama, Yokkaichi (JP); Kazuaki Takeda, Yokkaichi (JP); Takashi Tonosaki, Yokkaichi (JP)

(73) Assignees: AUTONETWORKS TECHNOLOGIES, LTD (JP); SUMITOMO WIRING SYSTEMS, LTD (JP); SUMITOMO ELECTRIC INDUSTRIES, LTD (JP)

( * ) Notice: Subject to any disclaimer, the term of this patent is extended or adjusted under 35 U.S.C. 154(b) by 0 days.

(21) Appl. No.: 14/364,220
(22) PCT Filed: Dec. 4, 2012
(86) PCT No.: PCT/JP2012/081309
§ 371 (c)(1),
(2) Date: Jun. 10, 2014
(87) PCT Pub. No.: WO2013/088987
PCT Pub. Date: Jun. 20, 2013

(65) Prior Publication Data
US 2014/0335722 A1  Nov. 13, 2014

(30) Foreign Application Priority Data
Dec. 12, 2011 (JP) .................................. 2011-271005

(51) Int. Cl.
H01R 4/62 (2006.01)
H01R 11/12 (2006.01)
(Continued)

(52) U.S. Cl.
CPC ............ *H01R 13/5227* (2013.01); *B60R 16/02* (2013.01); *H01R 4/18* (2013.01); *H01R 4/72* (2013.01); *H01R 4/185* (2013.01); *H01R 4/62* (2013.01); *H01R 11/09* (2013.01)

(58) Field of Classification Search
CPC ............ H01R 4/20; H01R 4/185; H01R 4/70; H01R 4/62; H01R 4/72
See application file for complete search history.

(56) References Cited

U.S. PATENT DOCUMENTS

| 4,151,364 | A | * | 4/1979 | Ellis | ...................... | B29C 61/003 |
| | | | | | | 174/84 C |
| 4,583,069 | A | * | 4/1986 | Pierce | .................. | H01H 85/201 |
| | | | | | | 174/84 C |

(Continued)

FOREIGN PATENT DOCUMENTS

| CN | 102832469 | 12/2012 |
| JP | 61-087474 U | 6/1986 |

(Continued)

OTHER PUBLICATIONS

International Search Report of Jan. 15, 2013.
(Continued)

*Primary Examiner* — Tulsidas C Patel
*Assistant Examiner* — Peter G Leigh
(74) *Attorney, Agent, or Firm* — Gerald E. Hespos; Michael J. Porco; Matthew T. Hespos

(57) ABSTRACT

A relay terminal (10) made of copper or copper alloy and configured to join an aluminum wire (20) and a copper wire (30) by being electrically connected to the aluminum wire (20) and the copper wire (30) includes a first barrel portion (11) to be caulked and crimped to an aluminum core (21) of the aluminum wire (20) made of aluminum or aluminum alloy, which is a metal different from copper or copper alloy constituting the relay terminal (10), a second barrel portion (12) to be caulked and crimped to a copper core (31) of the copper wire (30), a bottom plate (13) configured to link the first barrel portion (11) and the second barrel portion (12), and a projecting portion (41) (water drainage portion (40)) provided on the bottom plate (13) and configured to restrict the intrusion of water from the second barrel portion (12) toward the first barrel portion (11).

3 Claims, 7 Drawing Sheets

(51) Int. Cl.
*H01R 4/20* (2006.01)
*H01R 13/52* (2006.01)
*B60R 16/02* (2006.01)
*H01R 4/72* (2006.01)
*H01R 4/18* (2006.01)
*H01R 11/09* (2006.01)

(56) References Cited

U.S. PATENT DOCUMENTS

| | | | | |
|---|---|---|---|---|
| 5,004,869 | A | * | 4/1991 | Koblitz .............. H01R 13/5216 174/84 C |
| 5,369,225 | A | * | 11/1994 | Natwig ................. H01R 4/723 174/84 R |
| 5,393,932 | A | * | 2/1995 | Young .................... H01Q 1/244 174/84 R |
| 5,422,438 | A | * | 6/1995 | Lamome ................ H01R 4/203 174/76 |
| 5,727,725 | A | * | 3/1998 | Paskvich ........... B65H 45/1015 206/494 |
| 5,927,725 | A | * | 7/1999 | Tabata et al. .................... 277/607 |
| 6,146,215 | A | * | 11/2000 | Matsushita et al. ........ 439/752.5 |
| 7,306,495 | B2 | | 12/2007 | Hashimoto et al. |
| 7,402,751 | B2 | * | 7/2008 | Haberman ............. H01R 4/184 174/84 C |
| 8,974,258 | B2 | * | 3/2015 | Mitose et al. ................. 439/877 |
| 2002/0096353 | A1 | * | 7/2002 | Hanazaki ........... H01R 43/0585 174/84 C |
| 2002/0182934 | A1 | * | 12/2002 | Endo et al. .................... 439/578 |
| 2004/0115980 | A1 | * | 6/2004 | Douty et al. ................... 439/284 |
| 2004/0266261 | A1 | * | 12/2004 | Miyazaki ............... H01R 9/032 439/587 |
| 2005/0026515 | A1 | * | 2/2005 | Hashimoto et al. ........... 439/877 |
| 2006/0073743 | A1 | * | 4/2006 | Ford et al. ..................... 439/877 |
| 2008/0207034 | A1 | * | 8/2008 | Aita .............................. 439/277 |
| 2008/0245567 | A1 | * | 10/2008 | Haberman ............. H01R 4/184 174/84 C |
| 2009/0068865 | A1 | * | 3/2009 | Suzuki et al. .................... 439/92 |
| 2009/0133927 | A1 | | 5/2009 | Onuma |
| 2011/0124247 | A1 | * | 5/2011 | Okamura et al. ............. 439/877 |
| 2011/0223799 | A1 | * | 9/2011 | Hasebe et al. ................ 439/488 |
| 2011/0225820 | A1 | * | 9/2011 | Kondo .................. H01R 4/185 29/863 |
| 2012/0318575 | A1 | | 12/2012 | Koto |
| 2013/0126234 | A1 | * | 5/2013 | Ono ....................... H02G 15/08 174/75 R |

FOREIGN PATENT DOCUMENTS

| | | |
|---|---|---|
| JP | 10-289745 A | 10/1998 |
| JP | 2009-104875 | 5/2009 |
| JP | 2010-015900 | 1/2010 |
| JP | 2010-15900 | 1/2010 |
| JP | 2011-029102 | 2/2011 |
| JP | 2011-029102 | 7/2011 |

OTHER PUBLICATIONS

Written Opinion of Jan. 15, 2013.
Japanese Patent Application No. 2011-271005—Office Action issued Sep. 30, 2014.
Chinese Patent Appl. No. 201280057459.4—Office Action issued Aug. 25, 2015.
Korean Office Action issued on Aug. 19, 2015.

* cited by examiner

MULTIPLE WIRE CONNECTING TERMINAL

TECHNICAL FIELD

The present invention relates to a relay terminal.

BACKGROUND ART

Conventionally, copper wires made of copper or copper alloy having excellent electrical conductivity and strength have been used for a wiring harness wired in a vehicle. A copper terminal made of copper or copper alloy, which is the same type of metal as the copper wire, is crimped and connected to an end of the copper wire, and this copper terminal is connected to a device or the like.

In recent years, the weight of a vehicle has been further reduced to improve fuel economy and aluminum wires using aluminum or aluminum alloy as a conductive material have been used as wires to be arranged in the vehicle for the purpose of weight reduction. Although copper terminals made of copper or copper alloy, which is a different type of metal, are crimped and connected to ends of the aluminum wires in terms of strength and the like, the weight of the entire wiring harness is reduced by using the aluminum wires. Such a technique is known, for example, from Japanese Unexamined Patent Publication No. 2005-174896.

An aluminum wire similar to the above wire is used also for a relay terminal for connecting wires for the purpose of weight reduction in some cases. In such cases, the aluminum wire is connected to the relay terminal made of copper or copper alloy.

However, if a core of a wire and a terminal are formed of different types of metals in connecting the wire and the terminal, it is known that at least one of the two metals is dissolved in the form of ions into water and electrolytic corrosion, in which corrosion proceeds by an electrochemical reaction, occurs particularly when an electrolyte is present on a contact part of the wire and the terminal. In the case of the relay terminal as described above, if water or the like intrudes into one end connected to the aluminum wire from the other end, electrolytic corrosion possibly occurs in a part where the aluminum wire and the relay terminal are connected.

The present invention was completed based on the above situation and an object thereof is to suppress the progress of electrolytic corrosion in a part where different types of metals are connected.

SUMMARY OF THE INVENTION

To achieve the above object, the present invention is directed to a relay terminal made of metal and configured to join a first wire and a second wire by being electrically connected to the first and second wires, including a first barrel portion to be caulked and crimped to a first core made of a metal different from a metal constituting the relay terminal and exposed at an end of the first wire including the first core in such a manner as to embrace the first core from opposite sides; a second barrel portion to be caulked and crimped to a second core exposed at an end of the second wire in such a manner as to embrace the second core from opposite sides; a linking portion configured to link the first and second barrel portions; and a water drainage portion provided on the linking portion and configured to restrict the intrusion of water at least from the second barrel portion toward the first barrel portion.

If the metal constituting the first core and that constituting the first barrel portion are different, electrolytic corrosion may occur in either the first core or the first barrel portion when water adheres over the first core and the first barrel portion.

According to the above configuration, the intrusion of water along the linking portion from the second barrel portion toward the first barrel portion can be restricted by the water drainage portion. This can suppress the progress of electrolytic corrosion by suppressing the contact of water with a connected part of the first core and the first barrel portion where different types of metals are connected.

The following configurations are preferable as embodiments of the invention.

The linking portion may be a plate-like bottom plate, and the water drainage portion may be a projecting portion projecting from a plate surface of the bottom plate. According to such a configuration, the intrusion of water along the linking portion from the second barrel portion toward the first barrel portion can be suppressed by the projecting portion projecting from the plate surface of the bottom plate.

The projecting portion may be formed by bending the bottom plate. According to such a configuration, the water drainage portion can be easily formed only by bending the bottom plate.

The projecting portion may extend in a width direction intersecting with an arrangement direction of the first and second barrel portions and be formed over the entire width of the bottom plate. According to such a configuration, since the projecting portion is entirely formed in the width direction of the bottom plate, the intrusion of water from the second barrel portion toward the first barrel portion can be further suppressed as compared with a case where the projecting portion is partly formed in the width direction of the bottom plate.

The projecting portion may be a resin ring surrounding the bottom plate over the entire circumference. According to such a configuration, since the water drainage portion can be formed on the outer periphery of the bottom plate over the entire circumference, the intrusion of water from the second barrel portion toward the first barrel portion can be reliably restricted.

The water drainage portion may be a through hole formed to penetrate through the linking portion. According to such a configuration, the intrusion of water from the second barrel portion toward the first barrel portion can be suppressed by discharging the water running down along the linking portion through the through hole. Further, the water drainage portion can be easily and inexpensively formed by forming the through hole penetrating through a part, which will become the linking portion, in a plate thickness direction in punching a metal plate material constituting the relay terminal by a press.

The linking portion may be a plate-like bottom plate long and narrow in an arrangement direction of the first and second barrel portions, and the through hole may extend in a width direction intersecting with the arrangement direction of the first and second barrel portions. According to such a configuration, the intrusion of water along the linking portion from the second barrel portion toward the first barrel portion can be further suppressed as compared with a case where the through hole as the water drainage portion is formed to be narrow in the width direction.

The water drainage portion may be a cut groove formed by recessing at least one of the upper and lower surfaces of the linking portion. According to such a configuration, the intrusion of water from the second barrel portion toward the first barrel portion can be suppressed by discharging the water running down along the linking portion through the cut groove. Further, since the cut groove can be formed such as by striking the linking portion, the water drainage portion can be easily and inexpensively formed.

The cut groove may be formed on both the upper and lower surfaces of the linking portion. According to such a configuration, the intrusion of water from the second barrel portion toward the first barrel portion can be further suppressed.

The linking portion may be a plate-like bottom plate long and narrow in an arrangement direction of the first and second barrel portions, and the cut groove may be formed over the entire width of the bottom plate in a width direction intersecting with the arrangement direction of the first and second barrel portions. According to such a configuration, the intrusion of water from the second barrel portion toward the first barrel portion can be further suppressed as compared with a case where the cut groove as the water drainage portion is formed to be narrow in the width direction.

The first barrel portion caulked and crimped to the first core may be covered by a tubular waterproof covering. According to such a configuration, the intrusion of water not only from the second barrel portion, but also in outer peripheral directions, which are vertical and width directions, can be suppressed since the outer peripheral surface of the connected part of the first core and the first barrel portion is covered by the waterproof covering.

The first barrel portion may be made of copper or copper alloy, and the first core may be made of aluminum or aluminum alloy. Aluminum or aluminum alloy is easily dissolved in the event of electrolytic corrosion since having a higher tendency to ionize than copper or copper alloy. However, since the intrusion of water from the second barrel portion toward the first barrel portion can be further suppressed by the water drainage portion, the water drainage portion is particularly effective in the case of connecting the first barrel portion made of copper or copper alloy to the core made of aluminum or aluminum alloy.

The first and second wires may be arranged in a vehicle.

The application of the relay terminal to the first and second wires arranged in the vehicle is particularly effective.

According to the present invention, it is possible to suppress the progress of electrolytic corrosion in a part where different types of metals are connected.

DETAILED DESCRIPTION OF THE PREFERRED EMBODIMENTS

Figure 1:
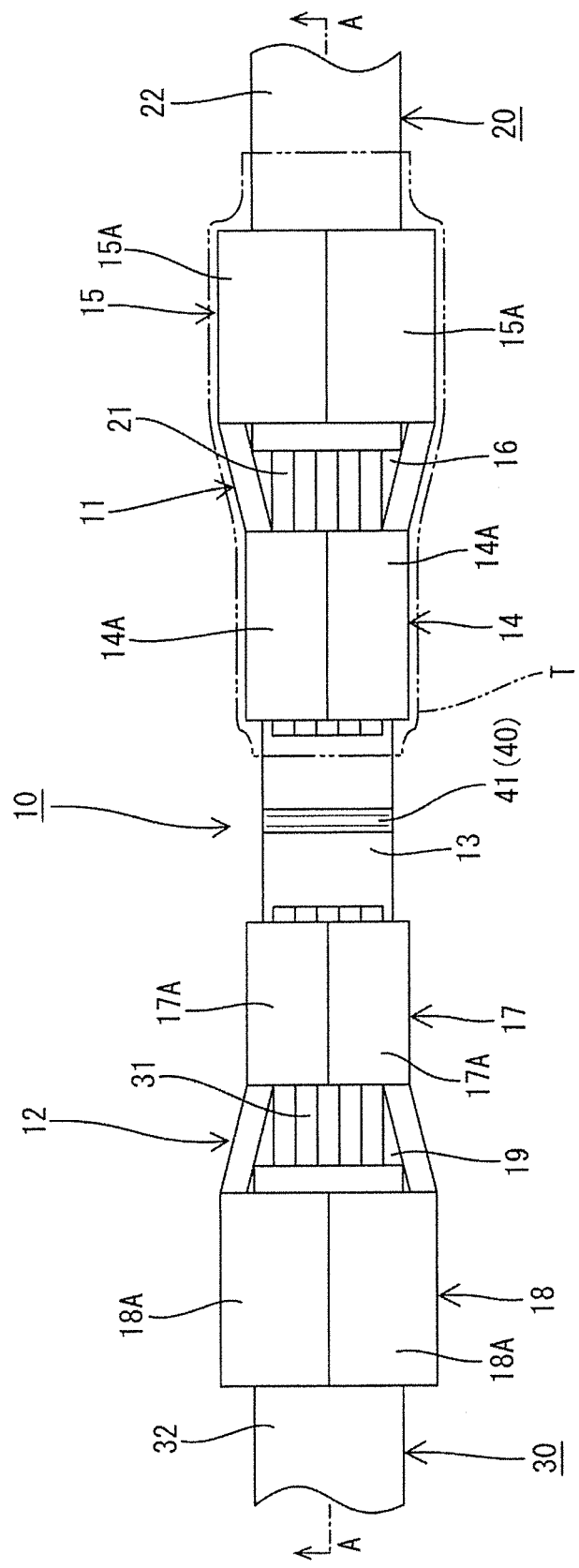
FIG. 1 is a plan view showing a state where a copper wire and an aluminum wire are connected to a relay terminal in a first embodiment.
Figure 2:
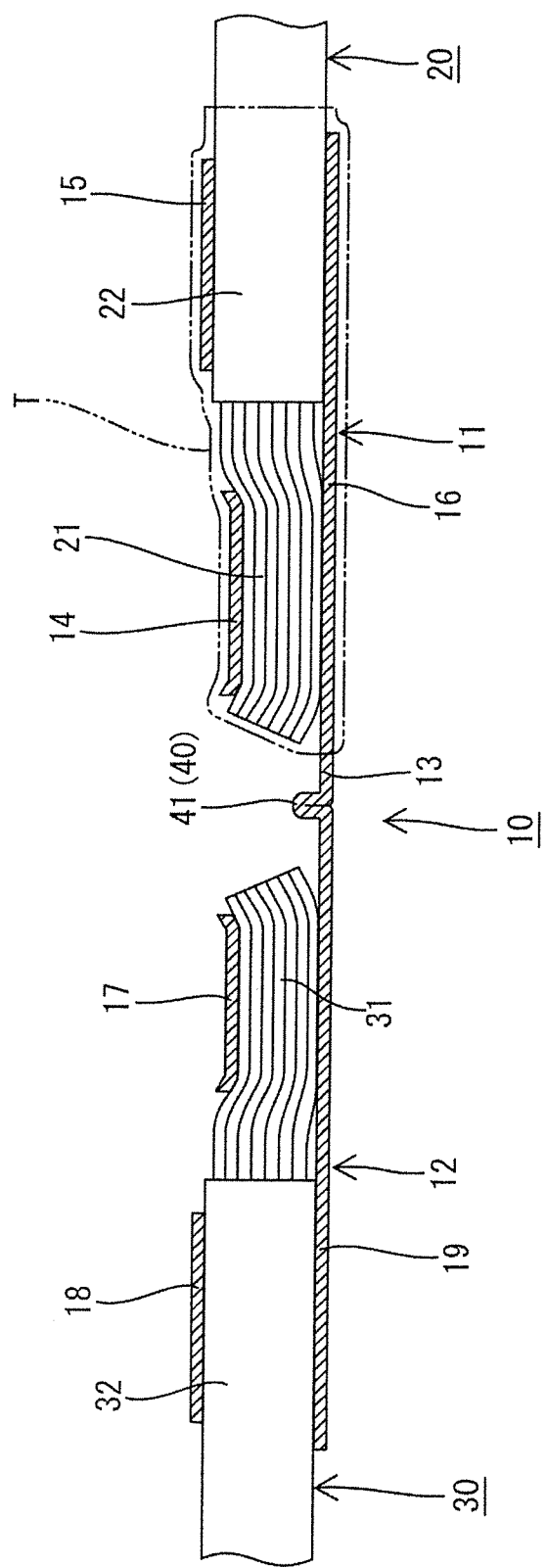
FIG. 2 is a section along A-A of FIG. 1.
Figure 3:
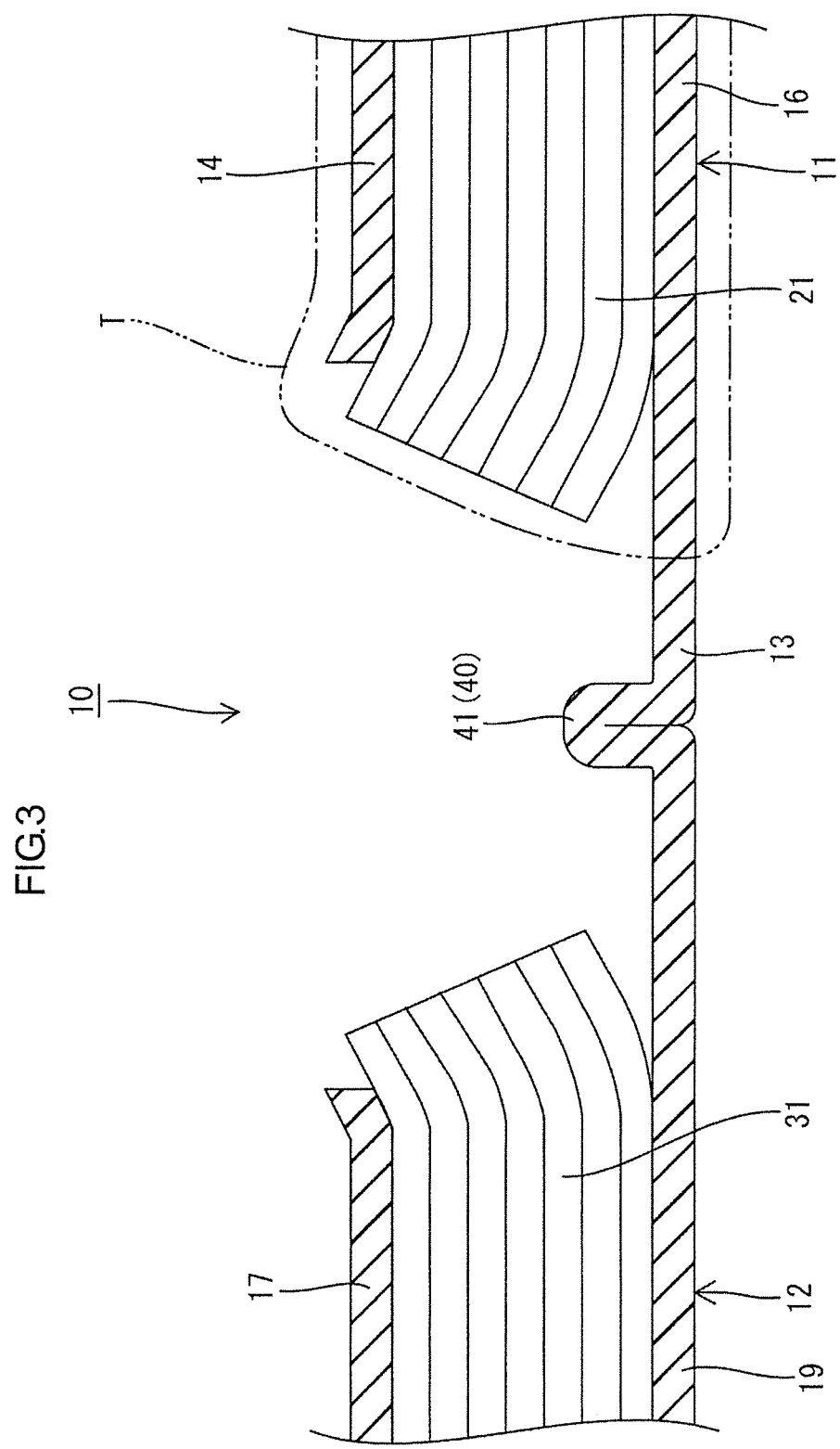
FIG. 3 is an enlarged section of an essential part of FIG. 2.

A first embodiment of the present invention is described with reference to FIGS. 1 to 3. A relay terminal 10 electrically conductively connected to an aluminum wire (an example of a first wire) 20 and a copper wire (an example of a second wire) 30 to be arranged in a vehicle (not shown) such as an automotive vehicle to join the both wires 20, 30 is illustrated in this embodiment as shown in FIGS. 1 and 2.

The aluminum wire 20 is composed of an aluminum core (an example of a first core) 21 made of a conductive material such as aluminum or aluminum alloy and an insulation coating 22 made of synthetic resin and covering the outer periphery of the aluminum core 21. The insulation coating 22 is removed by a predetermined length at an end of the aluminum wire 20 to expose the aluminum core 21.

The copper wire 30 is composed of an copper core (an example of a second core) 31 made of a conductive material such as copper or copper alloy and an insulation coating 32 made of synthetic resin and covering the outer periphery of the copper core 31. The insulation coating 32 is removed by a predetermined length at an end of the copper wire 30 to expose the copper core 31.

The relay terminal 10 is manufactured by punching a flat copper plate made of a conductive material such as copper or copper alloy by a press and bending the punched piece. The relay terminal 10 includes a first barrel portion 11 to be connected to the end of the aluminum wire 20, a second barrel portion 12 to be connected to the end of the copper wire 30 and a flat bottom plate (an example of a linking portion) 13 linking the first and second barrel portions 11, 12.

The first barrel portion 11 includes a first wire barrel 14 to be caulked and crimped to the aluminum core 21 exposed at the end of the aluminum wire 20, a first insulation barrel 15 to be caulked and crimped to the insulation coating 22 of the aluminum wire 20 and a first bottom plate 16 formed common to the first wire barrel 14 and the first insulation barrel 15.

The first wire barrel 14 is of a so-called open barrel type to be caulked and crimped to the aluminum core 21 of the aluminum wire 20 in such a manner as to embrace the aluminum core 21 from opposite sides, and includes a pair of first wire barrel pieces 14A, 14A rising upward from opposite widthwise side edges of the first bottom plate 16 while facing each other. The pair of first wire barrel pieces 14A, 14A are electrically conductively connected to the aluminum core 21 by being caulked and crimped to the aluminum core 21 in such a manner as to be wound on the outer periphery of the aluminum core 21 in the aluminum wire 20 placed on the first bottom plate 16.

The first insulation barrel 15 is formed on an end part of the first barrel portion 11 opposite to the bottom plate 13 and includes a pair of first insulation barrel pieces 15A, 15A rising upward from opposite widthwise side edges of the first bottom plate 16 while facing each other. The pair of first insulation barrel pieces 15A, 15A are caulked and crimped to the insulation coating 22 in such a manner as to be wound on the outer periphery of the insulation coating 22 in the aluminum wire 20 placed on the first bottom plate 16.

Further, the first barrel portion 11 is covered together with the aluminum core 21 of the aluminum wire 20 by a tubular heat shrinkable tube T (an example of a waterproof covering). Specifically, after being fitted on the aluminum core 21, the first wire barrel 14 caulked and crimped to the aluminum core 21 and the first insulation barrel 15 caulked and crimped to the insulation coating 22, the tubular heat shrinkable tube T is heated to shrink, whereby the outer peripheral surfaces of the aluminum core 21, the first wire barrel 14 and the first insulation barrel 15 are waterproofed by the heat shrinkable tube T. This can suppress the intrusion of water into a connected part of the aluminum core 21 and the first barrel portion 11 in outer peripheral directions such as vertical and width directions.

The second barrel portion 12 includes a second wire barrel 17 to be caulked and crimped to the copper core 31 exposed at the end of the copper wire 30, a second insulation barrel 18 to be caulked and crimped to the insulation coating 32 of the copper wire 30 and a second bottom plate 19 formed common to the second wire barrel 17 and the seconds insulation barrel 18.

The second wire barrel 17 is of a so-called open barrel type to be caulked and crimped to the copper core 31 of the copper wire 30 in such a manner as to embrace the copper core 31 from opposite sides, and includes a pair of second wire barrel pieces 17A, 17A rising upward from opposite widthwise side edges of the second bottom plate 19 while facing each other. The pair of second wire barrel pieces 17A, 17A are electrically conductively connected to the copper core 31 by being caulked and crimped to the copper core 31 in such a manner as to be wound on the outer periphery of the copper core 31 in the copper wire 30 placed on the second bottom plate 19.

The second insulation barrel 18 is formed on an end part of the second barrel portion 12 opposite to the bottom plate 13 and includes a pair of second insulation barrel pieces 18A, 18A rising upward from opposite widthwise side edges of the second bottom plate 19 while facing each other. The pair of second insulation barrel pieces 18A, 18A are caulked and crimped to the insulation coating 32 in such a manner as to be wound on the outer periphery of the insulation coating 32 in the copper wire 30 placed on the second bottom plate 19.

The bottom plate 13 is in the form of a flat plate extending in an arrangement direction of the first and second barrel portions 11, 12 and integrally formed to the first bottom plate 16 of the first barrel portion 11 and the second bottom plate 19 of the second barrel portion 12. Further, the bottom plate 13 links the first and second barrel portions 11, 12 such that the aluminum wire 20 connected to the first barrel portion 11 and the copper wire 30 connected to the second barrel portion 12 are coaxial. Specifically, the both wires 20, 30 are arranged while being spaced apart in an extending direction of the bottom plate 13.

A water drainage portion 40 is formed at an intermediate position of the bottom plate 13 between the first and second barrel portions 11, 12. The water drainage portion 40 is a projecting portion 41 projecting upward from the upper surface of the bottom plate 13, and formed by bending the bottom plate 13 upward, folding the bottom plate 13 in such a manner that opposite sides are held in close contact and bending the bottom plate 13 in an axial direction of the two wires 20, 30. Further, the projecting portion 41 extends in a width direction intersecting with the extending direction of the bottom plate 13 and is formed over the entire width of the bottom plate 13. Specifically, the upper surface of the first bottom plate 16 on which the aluminum wire 20 is placed and the upper surface of the second bottom plate 19 on which the copper wire 30 is placed are separated by the projecting portion 41.

This embodiment is configured as described above. Next, functions and effects of the relay terminal 10 are described.

Water may fall on wires arranged in a vehicle. If water adheres to the copper wire 30, the water adhering to the copper wire 30 may run down along the bottom plate 13 and intrude into the first barrel portion 11 connected to the aluminum wire 20 from the second barrel portion 12 connected to the copper wire 30. If dust or sand intrudes and mixed salt content adheres in a state where water is in contact with a connected part of the aluminum core 21 and the first wire barrel 14, the connected part is immersed in an electrolyte solution and electrolytic corrosion proceeds.

However, according to this embodiment, the projecting portion 41 separating the upper surface of the first bottom plate 16 on which the aluminum wire 20 is placed and that of the second bottom plate 19 on which the copper wire 30 is placed is formed on the bottom plate 13 between the first and second barrel portions 11, 12. That is, the projecting portion 41 can suppress the intrusion of water into the connected part of the aluminum core 21 and the first wire barrel 14 by blocking the water going to intrude along the upper surface of the bottom plate 13 from the second barrel portion 12 toward the first barrel portion 11 and discharging it in the width direction. This can suppress the progress of electrolytic corrosion in the connected part of the aluminum core 21 and the first wire barrel 14. Further, since the aluminum core 21 made of aluminum or aluminum alloy has a higher tendency to ionize than copper and copper alloy, the projecting portion 41 is particularly effective for the aluminum wire 20 connected to the relay terminal 10 made of copper or copper alloy.

Further, since the outer peripheral surface of the connected part of the aluminum core 21 and the first barrel portion 11 is covered by the heat shrinkable tube T according to this embodiment, the intrusion of water not only from the second barrel portion 12, but also in the outer peripheral directions, which are the vertical and width directions, can be suppressed. This can further suppress the progress of electrolytic corrosion in the connected part of the aluminum core 21 and the first wire barrel 14.

Further, since the projecting portion 41 of this embodiment can be formed only by bending the bottom plate 13 by the press, it can be easily formed.

Figure 4:
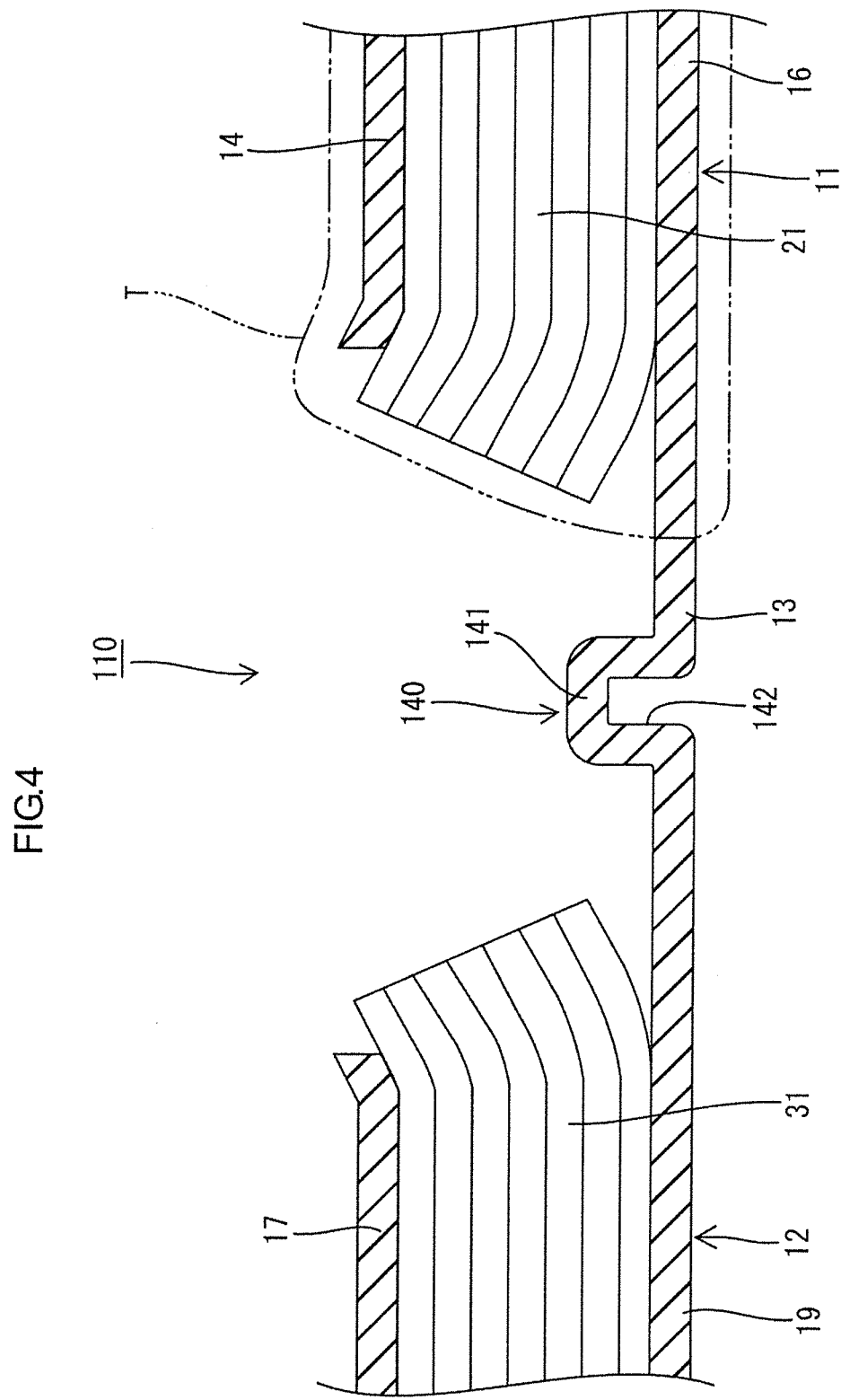
FIG. 4 is an enlarged section of an essential part in a second embodiment when a bottom plate is viewed from a lateral side.

Next, a second embodiment of the present invention is described with reference to FIG. 4. In a relay terminal 110 of the second embodiment, the shape of the water drainage portion 40 in the first embodiment is changed. Components, functions and effects common to the above embodiment are not described to avoid repeated description. Further, the same components as in the above embodiment are denoted by the same reference signs.

A water drainage portion 140 in the relay terminal 110 of the second embodiment is formed into an inverted U shape by bending a bottom plate 13 upward, bending the bottom plate 13 in an axial direction of two wires 20, 30, bending the bottom plate 13 downward and then bending the bottom plate 13 in the axial direction of the two wires 20, 30, and formed over the entire width of the bottom plate 13. Specifically, the water drainage portion 140 includes a projecting portion 141 projecting upward from the upper surface of the bottom plate 13 and a recessed groove 142 formed by recessing the lower surface of the bottom plate 13 upward. The upper surface of a first bottom plate 16 on which the aluminum wire 20 is placed and that of a second bottom plate 19 on which the copper wire 30 is placed are separated by the projecting portion 141, and the lower surface of the bottom plate 13 is partitioned by the recessed groove 142. This can suppress the intrusion of water along the upper surface of the bottom plate 13 from a second barrel portion 12 toward a first barrel portion 11 and suppress the intrusion of water along the lower surface of the bottom plate 13 from the second barrel portion 12 toward the first barrel portion 11. Consequently, the progress of electrolytic corrosion in a connected part of an aluminum core 21 and a first wire barrel 14 can be suppressed.

Figure 5:
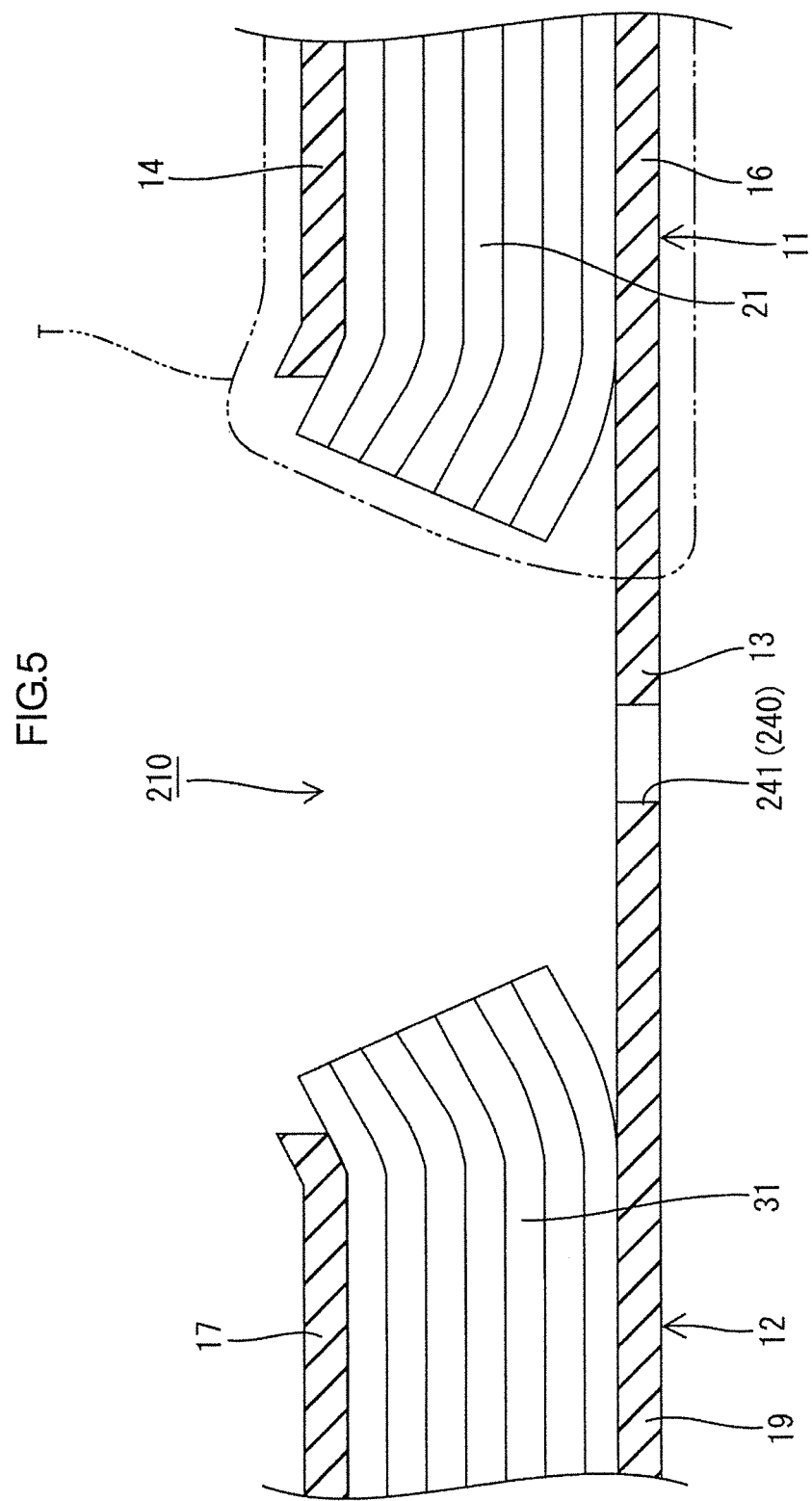
FIG. 5 is an enlarged section of an essential part in a third embodiment when a bottom plate is viewed from a lateral side.

Next, a third embodiment of the present invention is described with reference to FIG. 5. In a relay terminal 210 of the third embodiment, the shape of the water drainage portion 40 in the first embodiment is changed. Components, functions and effects common to the above embodiments are not described to avoid repeated description. Further, the same components as in the above embodiments are denoted by the same reference signs.

A water drainage portion 240 in the relay terminal 210 of the third embodiment is a through hole 241 formed to penetrate through a bottom plate 13 in the vertical direction (plate thickness direction of the bottom plate 13) and extends in the width direction. Specifically, the through hole 241 can discharge water running down along the upper surface of the bottom plate 13 downward. This can suppress the intrusion of water from a second barrel portion 12 toward a first barrel portion 11 by discharging the water going to intrude along the upper surface of the bottom plate 13 from the second barrel portion 12 toward the first barrel portion 11 downward through the through hole 241.

Further, since the through hole 241 can be simultaneously formed when a plate material made of copper or copper alloy and constituting the relay terminal 210 is punched by a press, it can be easily and inexpensively formed as in the first embodiment.

Figure 6:
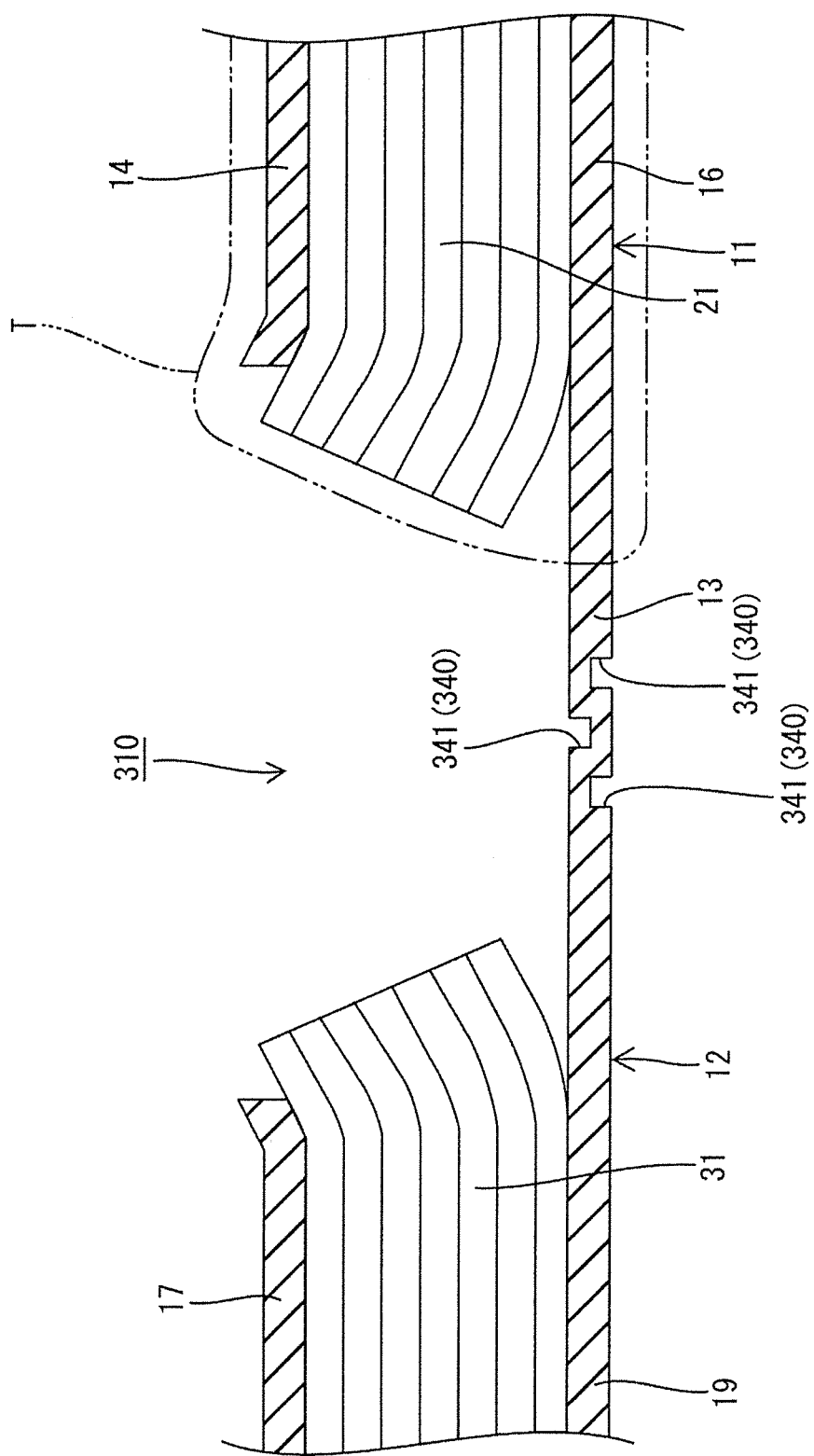
FIG. 6 is an enlarged section of an essential part in a fourth embodiment when a bottom plate is viewed from a lateral side.

Next, a fourth embodiment of the present invention is described with reference to FIG. 6. In a relay terminal 310 of the fourth embodiment, the shape of the water drainage portion 40 in the first embodiment is changed. Components, functions and effects common to the above embodiments are not described to avoid repeated description. Further, the same components as in the above embodiments are denoted by the same reference signs.

A water drainage portion 340 in the relay terminal 310 of the fourth embodiment is in the form of cut grooves 341 formed by grooves having a recessed cross-section (U-shaped grooves) by striking the upper and lower surfaces of a bottom plate 13, and formed over the entire width of the bottom plate 13. Further, one cut groove 341 is formed on the upper surface of the bottom plate and two are formed on the lower surface, and the two cut grooves 341 on the lower surface are formed side by side in an extending direction of the bottom plate 13. Specifically, the cut grooves 341 are capable of discharging water running down along the upper and lower surfaces of the bottom plate 13 in the width direction. This can suppress the intrusion of water from a second barrel portion 12 toward a first barrel portion 11 by discharging the water going to intrude along the upper and lower surfaces of the bottom plate 13 from the second barrel portion 12 toward the first barrel portion 11 in the width direction by the cut grooves 341.

Further, since the cut grooves 341 can be formed by striking the bottom plate 13, they can be easily and inexpensively formed as in the first embodiment.

Figure 7:
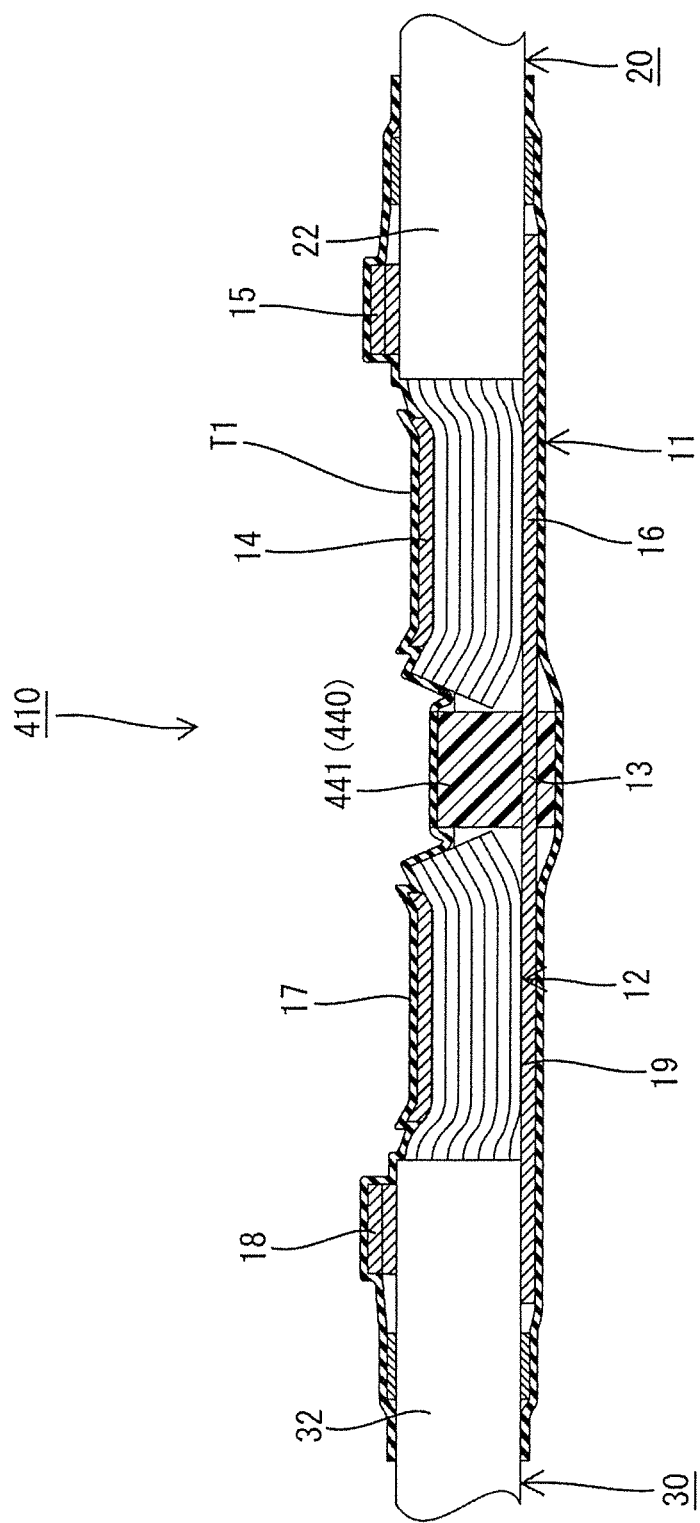
FIG. 7 is a section showing a state where a copper wire and an aluminum wire are connected to a relay terminal in a fifth embodiment.

Next, a fifth embodiment of the present invention is described with reference to FIG. 7. In the fifth embodiment, the shape of the water drainage portion 40 and the heat shrinkable tube in the first embodiment are changed. Components, functions and effects common to the above embodiments are not described to avoid repeated description. Further, the same components as in the above embodiments are denoted by the same reference signs.

A water drainage portion 440 in the relay terminal 410 of the fifth embodiment is a resin ring 441 formed by surrounding a bottom plate 13 over the entire circumference by resin such as through molding. Further, the resin ring 441 is formed to be thick on an upper surface side of the bottom plate 13 and thin on a lower surface side of the bottom plate 13. A thickness of the resin ring 441 on the upper surface side of the bottom plate 13 is substantially equal to heights of cores 21, 31 of two wires 20, 30, and that of the resin ring 441 on the lower surface side of the bottom plate 13 is substantially equal to plate thicknesses of first and second barrel portions 11, 12. Specifically, the resin ring 441 is set to have substantially the same height as a first wire barrel 14 connected to an aluminum core 21 and a second wire barrel 17 connected to a copper core 31, and is slightly offset downward from the first wire barrel 14 connected to the aluminum core 21 and the second wire barrel 17 connected to the copper core 31.

A heat shrinkable tube (an example of the waterproof covering) T1 of the fifth embodiment is set to have a length from an end of an insulation coating 22 in the aluminum wire 20 to an end of an insulation coating 32 in the copper wire 30. After collectively covering the outer peripheral surface of the first wire barrel 14 connected to the aluminum core 21, that of the second wire barrel 17 connected to the copper core 31 and that of the resin ring 441 over the entire circumferences, the heat shrinkable tube T1 is heated to shrink, thereby being held in close contact with the outer peripheral surface of the relay terminal 410. Specifically, the relay terminal 410 is protected so as not to come into contact with water by being enclosed in the heat shrinkable tube T1. Note that since the first wire barrel 14 connected to the aluminum core 21, the second wire barrel 17 connected to the copper core 31 and the resin ring 441 are set to have substantially the same height, the heat shrinkable tube T1 can be reliably held in close contact with the outer peripheral surfaces thereof. This can prevent the intrusion of water into a connected part of the aluminum core 21 and the first wire barrel 14.

Even if water intrudes into the second barrel portion 12 in the heat shrinkable tube T1, the intrusion of the water into the first barrel portion 11 from the second barrel portion 12 can be prevented and the progress of electrolytic corrosion in the connected part of the aluminum core 21 and the first wire barrel 14 can be suppressed since the resin ring 441 surrounding the bottom plate 13 is formed on the bottom plate 13 between the first and second wire barrels 11, 12 and the heat shrinkable tube T1 is held in close contact with the resin ring 441.

The present invention is not limited to the above described and illustrated embodiments. For example, the following embodiments are also included in the technical scope of the present invention.

Although the projecting portion 41 is configured to project only upward from the upper surface of the bottom plate 13 in the above first embodiment, the present invention is not limited to such a mode. For example, a projecting portion may project downward from the lower surface of the bottom plate 13.

Although the bottom plate 13 is formed with one water drainage portion 40, 140, 240 or 440 in each of the above first, second, third and fifth embodiments, the present invention is not limited to such a mode. For example, the bottom plate 13 may be formed with a plurality of water drainage portions.

Although the cut grooves 341 have a U-shaped cross-sectional shape in the above fourth embodiment, the present invention is not limited to such a mode. For example, the cut grooves may have a V-shaped or arcuate cross-sectional shape.

Although the second wire is the copper wire 30, there is no limitation to this. The second wire may be an aluminum wire in which a second core is made of aluminum or aluminum alloy. An arbitrary metal can be appropriately used according to need.

The relay terminal can be applied not only in the case of electrically connecting the first and second wires arranged in the vehicle, but also in the case of electrically connecting first and second wires arranged in an arbitrary place according to need.

LIST OF REFERENCE SIGNS 10, 110, 210, 310, 310: relay terminal
11: first barrel portion
12: second barrel portion
13: linking portion (bottom plate)
20: aluminum wire (first wire)
21: aluminum core (first core)
30: copper wire (second wire)
31: copper core (second core)
40, 140, 240, 340, 440: water drainage portion
41, 141: projecting portion (water drainage portion)
241: through hole (water drainage portion)
341: cut groove (water drainage portion)
441: resin ring (water drainage portion)
T, T1: heat shrinkable tube (waterproof covering)

The invention claimed is:

1. A relay terminal made of metal and configured to join a first wire and a second wire by being electrically connected to the first and second wires, comprising:
   a first barrel portion caulked and crimped to a first core made of a metal different from a metal constituting the relay terminal and exposed at an end of the first wire including the first core in such a manner as to embrace the first core from opposite sides;
   a second barrel portion caulked and crimped to a second core exposed at an end of the second wire in such a manner as to embrace the second core from opposite sides;
   a linking portion defining a plate that links the first and second barrel portions;
   a water drainage portion provided on the linking portion, the water drainage portion defining a resin ring that surrounds the plate of the linking portion over an entire circumference thereof and that projects out from the plate over the entire circumference to restrict intrusion of water at least from the second barrel portion toward the first barrel portion; and
   a tubular waterproof covering that covers the first and second barrel portions that have been caulked and crimped respectively to the first and second cores and that bridges the linking portion and the resin ring that surrounds the plate of the linking portion.

2. The relay terminal of claim 1, wherein:
   the first barrel portion is made of copper or copper alloy; and
   the first core is made of aluminum or aluminum alloy.

3. The relay terminal of claim 1, wherein the first and second wires are arranged in a vehicle.

* * * * *